United States Patent
Amano (10) Patent No.: US 6,823,796 B1
(45) Date of Patent: Nov. 30, 2004

(54) GAS GENERATOR

(75) Inventor: Junya Amano, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/089,095

(22) PCT Filed: Oct. 13, 2000

(86) PCT No.: PCT/JP00/07116
§ 371 (c)(1),
(2), (4) Date: Apr. 12, 2002

(87) PCT Pub. No.: WO01/26938
PCT Pub. Date: Apr. 19, 2001

(30) Foreign Application Priority Data

Oct. 14, 1999 (JP) .......................................... 11-291765
Oct. 14, 1999 (JP) .......................................... 11-291766

(51) Int. Cl.[7] ............................................. F42C 19/12
(52) U.S. Cl. ................................ 102/202.14; 102/530
(58) Field of Search ............................. 102/530, 202.5, 102/202.9, 202.14; 280/736, 741

(56) References Cited

U.S. PATENT DOCUMENTS

| | | | | |
|---|---|---|---|---|
| 4,959,011 A | * | 9/1990 | Nilsson ........................ | 431/263 |
| 5,131,679 A | * | 7/1992 | Novak et al. ................. | 280/736 |
| 5,140,906 A | * | 8/1992 | Little, II ................... | 102/202.14 |
| 5,142,982 A | * | 9/1992 | Diepold et al. ............. | 102/202.5 |
| 5,461,983 A | * | 10/1995 | Matsuki et al. ............. | 102/530 |
| 5,483,896 A | * | 1/1996 | Hock et al. .................. | 102/530 |
| 5,602,359 A | * | 2/1997 | Hambro et al. .......... | 102/202.5 |
| 5,648,634 A | * | 7/1997 | Avory et al. .............. | 102/202.1 |
| 5,677,505 A | * | 10/1997 | Dittrich ..................... | 89/14.5 |
| 5,730,462 A | * | 3/1998 | Jackson et al. ............. | 280/741 |
| 6,220,163 B1 | * | 4/2001 | Duguet et al. ........... | 102/202.2 |
| 6,553,914 B2 | * | 4/2003 | Hosey et al. ............... | 102/530 |

FOREIGN PATENT DOCUMENTS

| | | |
|---|---|---|
| JP | 1-301435 | 12/1989 |
| JP | 6-300497 | 10/1994 |
| JP | 9-2204 | 1/1997 |
| JP | 10-217900 | 8/1998 |
| JP | 11-240412 | 9/1999 |
| WO | 99-00275 | 1/1999 |

* cited by examiner

Primary Examiner—Charles T. Jordan
Assistant Examiner—T. Nguyen
(74) Attorney, Agent, or Firm—Oblon, Spivak, McClelland, Maier & Neustadt, P.C.

(57) ABSTRACT

A gas generator G of the present invention has a construction in which a holder (3, 73) is fitted into a cup body (1, 71) and a tube body (2) or a container body (72) and encloses gas generants P and ignition agents (6, 76).

The holder (3, 73) is formed of resin. A metallic reinforcement 4 is integrated with the resin holder (3) by insert molding.

Or, a ring body (74) for sealing the cup body (71) and the holder (73) is mounted on the holder (73).

3 Claims, 11 Drawing Sheets

(Prior Art)

GAS GENERATOR

TECHNICAL FIELD

The present invention relates to a gas generator for actuating a seat belt pretensioner of an automobile.

BACKGROUND ART

A seat belt pretensioner is known as a safety system for protecting occupants in an automobile from an impact generated in a collision of the automobile. The pretensioner is actuated by a large amount of gas introduced by a gas generator and subsequently protects the occupants. The gas generator includes a squib as an ignitor, gas generants and the like. The gas generator ignites the squib in the collision, thereby fires and burns the gas generants then generates a large amount of gas rapidly.

Figure 11:
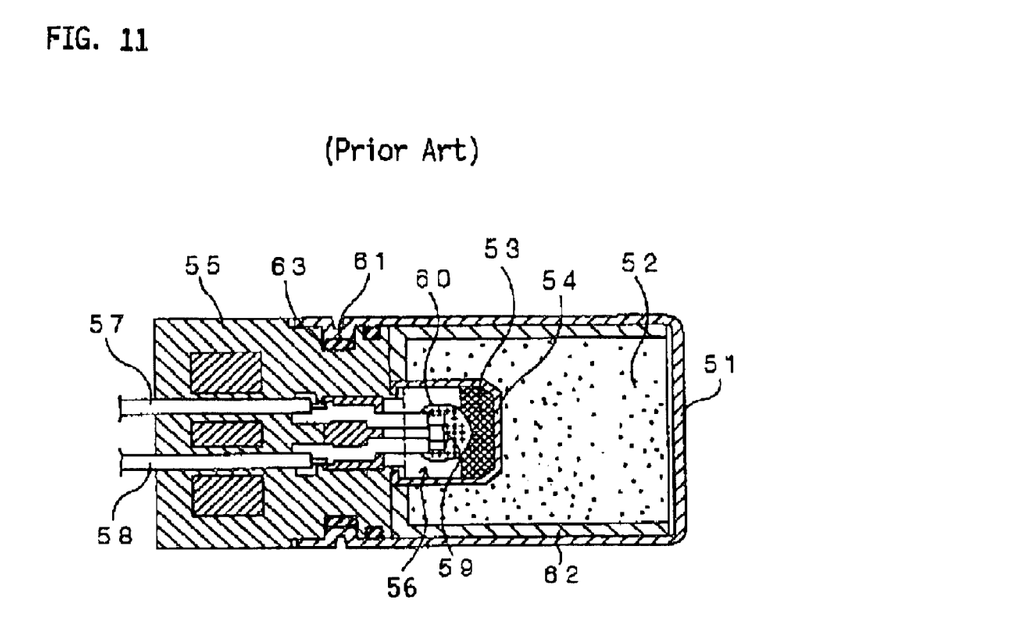
FIG. 11 is a sectional view showing a conventional gas generator.

As an example of conventional gas generators, a gas generator shown in FIG. 11 has been proposed. The gas generator shown in FIG. 11 includes a cup body 51 in a shape of cylinder with a bottom loaded with gas generants 52, a tube body 54 housing firing agents 53, and a holder 55 of which some parts are fitted in the cup body 51 and th tube body 54 respectively to seal the cup body 51 containing the gas generants 52 in its inside and the tube body 54 containing the firing agents 53 in its inside. The holder 55 is made of resin. The holder 55 is integrally provided with a squib 56 for igniting the firing agents 53. The squib 56 includes two electrode pins 57, 58 penetrating the holder 55 and projecting within the tube body 54, a bridge wire 59 welded to the respective electrode pins 57, 58 in the tube body 54, and an igniting agent ball 60 covering the bridge wire 59 and being in contact with the firing agents 53.

In this gas generator, the parts of the holder 55 is inserted in an opening of the cup body 51. An end portion of the cup body 51 on the opening side is caulked in caulking groove 63 so that the end portion comes into contact with a sealing ring 61 flexibly in the caulking groove 63 of the holder 55. Thus, the cup body 51 is sealed by the holder 55. Further, an end portion on an opening side or the tube body 54 is supported on the holder 55 by means of an inner cylindrical member 62 fitted in the cap body 51. As a result, the tube body 54 comes into close contact with the holder 55 then an inside space of the tube body 54 is tightly shut out, In the gas generator of the above-mention d construction, when electric current is passed through the respective electrode pins 57, 58 of the squib 56, the bridge wire 59 generates heat then the igniting agent ball 60 ignites. The igniting agent ball 60 fires the firing agents 53. A flame of ignition of the squib 56 is ejected into the cup body 51. The gas generants 52 are ignited and burned by the flame then a large amount of gas generates rapidly.

However, since this type of conventional gas generator has a construction where the cup body 51 and the holder 55 are sealed by the caulking portion, there is an adverse possibility that a caulking force acts on the holder 55 then the holder 55 is deformed. A lack of high accuracy in the caulking position of the cup body 51 causes direct press and deformation to the holder. The deformation of the holder 55 generates gaps between the holder 55 and the respective electrode pins 57, 58 and the like. Water and the like go into the tube body 54 from the gaps then deteriorate the firing agents 54, the igniting agent ball 60 and the like. Therefore, performance of the gas generator is not ensured over a long period of time of use.

Further, the cup body 51 and the holder 65 are sealed by caulking portion of the cup body 51 and the sealing ring and the like, and the tube body 54 and the holder 55 are sealed by a cup member 62. Therefore, a number of members for sealing the above-mentioned components increases. As a result, cost of manufacture of the gas generators cannot be reduced.

It is an object of the present invention to provide a gas generator for use in occupant safety systems such as seat belt pretensioner, which has excellent durability, and of which cost of manufacture is reduced.

DISCLOSURE OF THE INVENTION

A gas generator comprises a cup body loaded with gas generants generating gas by combustion, a tube body arranged inside of the cup body to contain firing agents ignited by electric current, a holder made of resin and fitted in both the cup body and the tube body for enclosing the gas generants and the firing agents, and a reinforcement is integrated with the resin of the holder by insert molding.

According to the present invention having the above described construction, even when the holder is made of resin, a deformation of the holder caused by a caulking force for connecting the cup body to the holder is restrained by the reinforcement. Also, a deformation of the holder caused by thermal expansion is restrained by the reinforcement.

Therefore, the invention prevents gaps that arise by deformation of the holder, whereby water and the like do not enter the tube body. As a result, performance of the gas generator is ensured over a long period of time of use.

Further, the gas generator of the present invention is preferably constructed as follows. The reinforcement has a protruding portion from an outer periphery of the holder. The protruding portion is fitted into the cup body. Inter-gaps among the cup body, the tube body and the holder are tightly closed by means of a caulking force between the protruding portion and the cup body.

Since the caulking force acts between the cup body and the protruding portion of the reinforcement, high accuracy in the caulking position is not required. Since a simple caulking construction between the cup body and the reinforcement enables the inter-gaps among the cup body, the tube body and the holder to be integrally and tightly closed, the number of sealing members such as sealing rings is decreased. Also, the strength of the holder is increased by the reinforcement. Therefore, a gas generator can be provided, which has excellent durability and for which the cost of manufacturing is reduced.

Additionally, the gas generator of the present invention is preferably constructed as follows. The tube body has a flange protruding towards the cup body, the flange is sandwiched in between the cup body and the protruding portion of the reinforcement.

The reinforcement restrains that the caulking force from acting on the resin of the holder directly, and prevents the holder from deforming.

Also, the gas generator of the present invention is preferably constructed as follows. The reinforcement consists of a cylindrical body and a ring plate body so as to have a cup shape. The cylindrical body protrudes from the outer periphery of the holder. The ring plate body is integrated with the resin of the holder.

The reinforcement constructed above enables the strength of the holder to increase, and the connecting the cup body to the holder with caulking to be done easily.

Another gas generator of the present invention comprises a cup body loaded with gas generants generating gas by combustion, a tube body arranged inside of the cup body to contain firing agents ignited by electric current, a holder made of resin and fitted in both the cup body and the tube body for enclosing the gas generants and the firing agents, and a ring body mounting fixedly on a part of outer periphery of the holder so that an inter-gap between the cup body and the holder is tightly closed.

According to the present invention having the above described construction, high accuracy in a caulking position between the cup body and the holder is not required. The inter-gap between the cup body and the holder is tightly closed by means of a simple operation in which the ring body is mounted fixedly on the part of the outer periphery of the holder.

In addition, according to the present invention, since the caulking force does not act on the cup body directly, the caulking force is restrained from acting on the resin of the holder through the cup body. Deformation of the holder is thereby prevented.

As a result, the cost for manufacturing the gas generator is decreased. Also, the invention prevents gaps from arising due deformation of the holder. Therefore, water and the like do not enter the tube body, the performance of the gas generator is ensured over a long period of time of use. A gas generator can be provided, which has excellent durability and for which the cost of manufacture is reduced.

Further, in the gas generator of the present invention, a sealing layer is preferably provided among the ring body, the cup body and the holder.

The sealing layer improves a seal property among the ring body, the cup body and the holder. As a result, a gas generator with more excellent durability can be provided.

BEST MODE FOB CARRYING OUT THE INVENTION

An embodiment of a gas generator of the present invention will be given with reference to the drawings.

Figure 1:
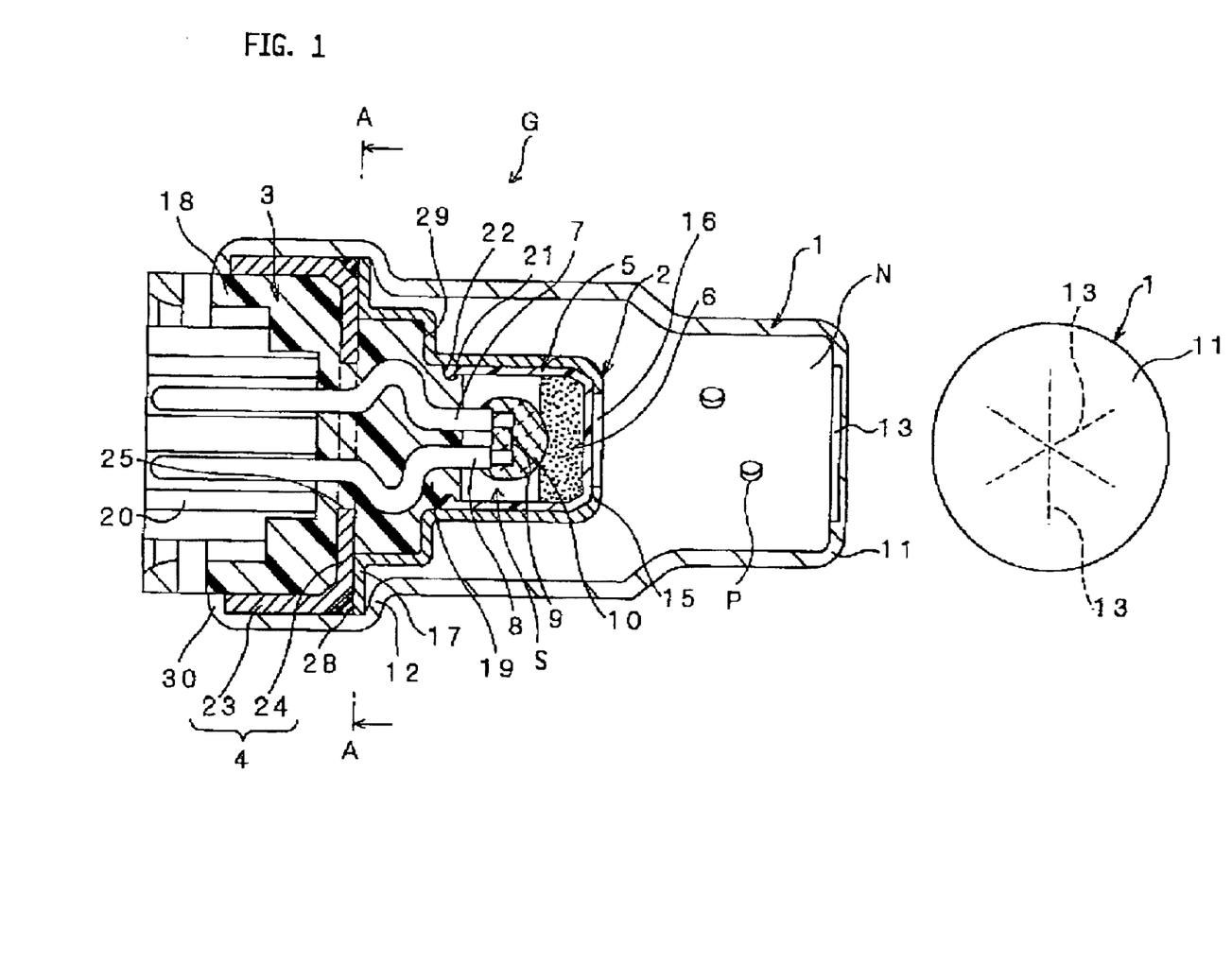
FIG. 1 is a built-up sectional view showing a gas generator of the present invention.
Figure 2:
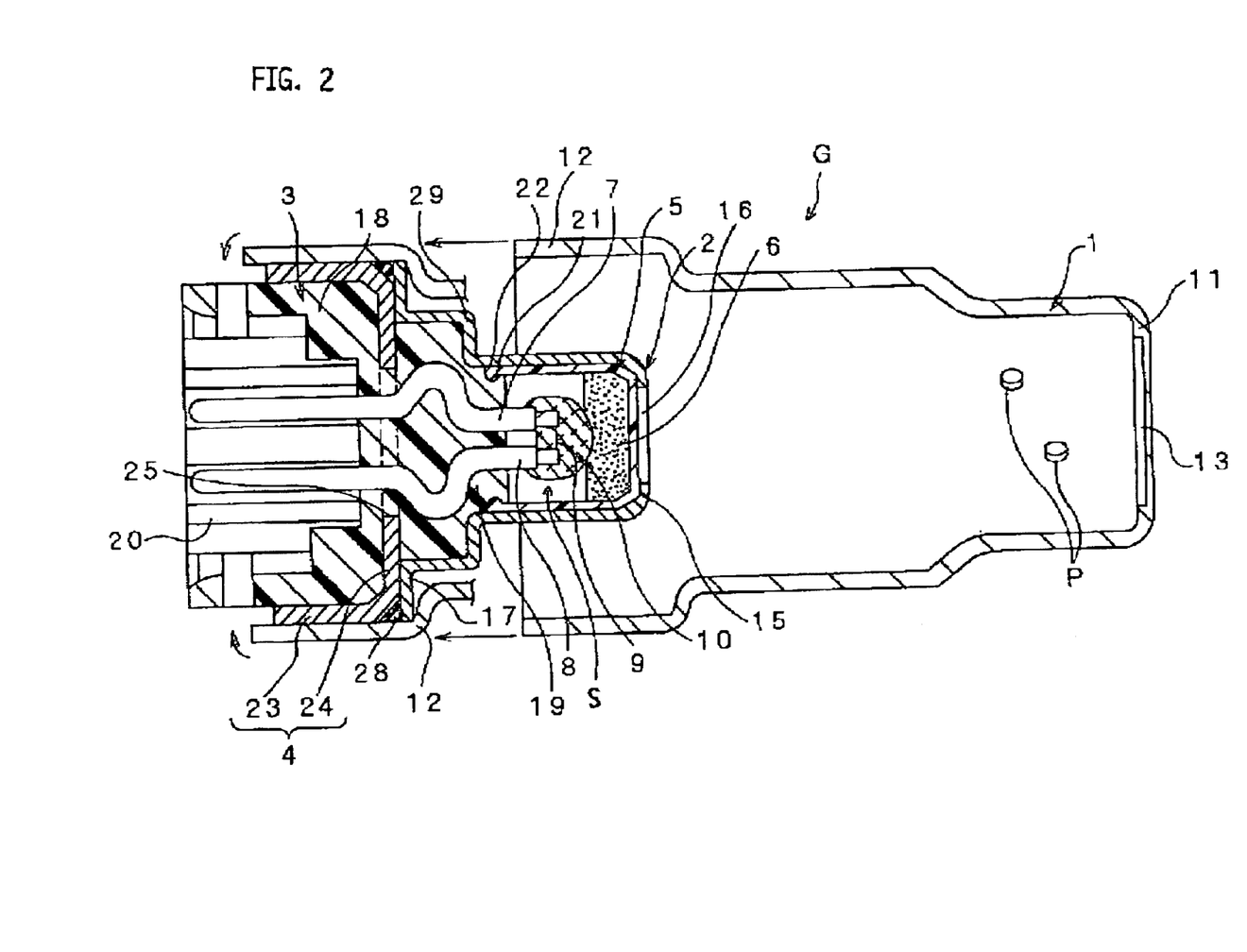
FIG. 2 is an exploded sectional view showing a gas generator of the present invention.

A gas generator G shown in FIGS. 1 and 2 is what actuates a pretensioner for seat belts of an automobile. Gas generants P are burned by ignition of a squib S then a large amount of gas generates rapidly. The gas generator G includes a cup body 1, a tube body 2, and a holder 3 in addition to the squib S and the gas generants P. The holder 3 is made of resin by insert molding. A reinforcement 4 is integrated with the holder 3 so as to cover an outer surface of the holder 3. In the gas generator G of the present invention, for the purpose of caulking, an edge of the cup body 1 on an opening side is bent onto the reinforcement 4 so as to cover an outer periphery of the reinforcement 4. Thereby, the cup body 1 is sealed up. And then, inter-gaps among the cup body 1, the tube body 2 and the holder 3 are tightly closed at the same time. The squib S includes firing agents 6, two electrode pins 7, 8, a bridge wire 9, an igniting agent ball 14 and a container body 5. The container body 5 has a cylindrical shape with a bottom for containing the firing agents 6, leading edges of the two electrode pins 7, 8, the bridge wire 9 and the igniting agent bail 10. And the squib 8 is integrated with the holder 3.

The cup body 1 of the gas generator G has a cylindrical shape with a bottom, of which the diameter becomes larger in step-by-step, and is made of metal materials such as stainless steel or aluminum. The cup body 1 is loaded with the gas generants P that generate gas by combustion. Step portions are formed in the cup body 1, of which diameters increase from the bottom 11 side towards the opening side. A plurality of notches 13 (e.g. six notches in FIG. 1) are formed with the bottom 11 of the cup body 1. Each of the notches 13 is radially arranged from an axis of the cup body 1 and carved with a predetermined depth within the cup body 1. When the bottom 11 of the cup body 1 is partially spread in accordance with an increase of internal pressure in the cup body 1, the notches 13 form a gas discharge hole so as to communicate the inside and an outside of the cup body 1.

The tube body 2 is made of metal materials such as stainless steel or aluminum and formed into a cylindrical shape, which is disposed within the cup body 1. The cylindrical tube body 2 is a cylinder of which the diameter increases step-by-step. One opening of the tube body 2 on a smaller diameter side is an inflammation hole 16. A flange 17 is formed at an end portion of the tube body 2 on a larger diameter opening side as a portion projecting to a step portion 12 of the cup body 1. The flange 17 abuts the step portion 12 within the cup body 1 and forms a combustion chamber H for the gas generants F with the cup body 1. The container body 5 of the squib S is inserted in the tube body 2 until the inflammation hole 16 is closed by the container body 5. The firing agents 6 are contained in the container body 5.

The holder 3 includes a holder's main body 18 and a shaft body 19 of which diameter decreases with two-stages from the holder's main body 18. Therefore, the shape of the holder 3 has shoulder portions. The shaft body 19 is fitted in the opening of the tube body 2. A fitting hole 20 for a plug is formed in the holder's main body 18, which opens toward an opposite side to the shaft body 19. A tip portion of the shaft body 19 is inserted in the container body 5. The tip of the shaft body 19 has a fitting groove 22 in which a protrusion 21 on an opening side of the container body 5 is fitted. The holder 3 is made by means of injecting resin containing glass fibers and the like into a mold (not shown). As examples of the resin, there are polyeutylene terephthalate, polyethylene terephthalate, nylon 6, nylon 66, polyphenylene sulfide, and polyphenylene oxide.

Electrode pins 7, 8 of the squib S and a reinforcement 4 are integrated with the holder 3. Such holder is obtained by the following insert molding. The respective electrode pin 7, 8 and the reinforcement 4 are prepared in the above-mentioned mold in advance. Then, resin is injected into the mold. The resinous holder 3 integrally formed with the electrode pins 7, 8 and the reinforcement 4 is hereby obtained.

The respective electrode pin 7, 8 is arranged in parallel with an axis of the gas generator G and penetrates the shaft body 19 of the holder 3. The respective electrode pin 7, 8 has a curvature shape in the shaft body 19. And the respective electrode pin 7, 8 protrudes in the fitting hole 20 of the holder's main body 18 and the container body 5. The respective electrode pin 7, 8 is made of conductive materials such as stainless steel, iron-nickel alloy and electrically insulated by the resin of the holder 3. Further, the bridge wire 9 is welded to the respective electrode pin 7, 8 in the container body by welding and the like. The igniting agent ball 14 is formed so as to cover tip portions of the respective electrode pin 7, 8 and the bridge wire 9. And the igniting agent ball 10 is in contact with the firing agents 6 in the container body 5. Thus, the holder 3 is integrally provided with the squib S which includes the container body 5, the firing agents S, the respective electrode pin 7, 8 and the like.

As examples of materials of the reinforcement 4, there are metal materials such as stainless steel and SPCC and reinforced plastics such as heat curing resin and the like. The reinforcement 4 is formed so as to have a cup shape with a cylindrical body 23 and a ring plate body 24. The cylindrical body 23 covers an outer periphery of the holder's main body 18 so as to be a protruding portion. And the ring plate body 24 is substantially perpendicularly connected to the cylindrical body 23. A corner of junction in which the cylindrical body 23 and the ring plate body 24 are connected, is chamfered.

Figure 3:
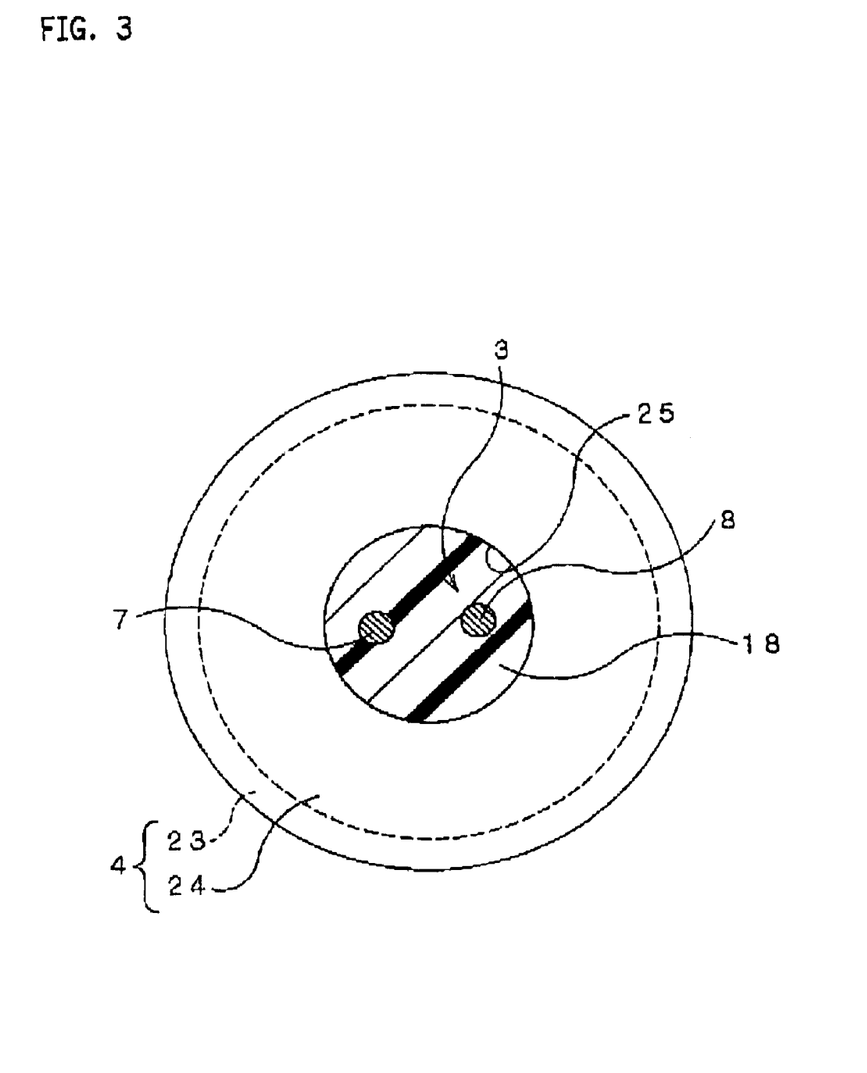
FIG. 3 is a sectional view, taken on line A—A of FIG. 1.

The ring plate body 24 is located between the holder's main body 18 and the shaft body 19, and perpendicular to the respective electrode pins 7, 8. One portion on an inner periphery side of the ring plate body 24 is integrated with the resin holder 3. Another portion on the outer periphery side of the ring plate body 24 is partially exposed to the outside of the holder 3. The portion of the ring plate body 24 exposed to the outside of the holder 3 constructs the protruding portion with the cylindrical body 23. As shown in FIG. 3, the respective electrode pin 7, 8 passes through in an inner periphery hole 25 of the ring plate body 24.

The gas generator G constructed as thus is manufactured in the following steps.

The resinous holder 3 is obtained by the following insert molding, which is integrated with the respective electrode pin 7, 8 and the reinforcement 4. The respective electrode pins 7, 8 and the reinforcement 4 are set in a mold for molding the holder 3 in advance. Resin is injected into the sold. The resinous holder 3 is obtained, which is integrated with the respective electrode pin 7, 8 and the reinforcement 4.

Then, the bridge wire 9 is welded to the respective electrode pin 7, 8 and covered with the igniting agent ball 10. The firing agents 6 are contained in the container body 5. The shaft body 19 of the holder 3 is fitted into the container body 5, thereby the squib. S and the holder 3 are integrated.

Then, a sealing ring 28 is mounted on the chamfered corner portion of the outer periphery side of the reinforcement 4 of the holder 3. The container body 5 of the squib S of the holder 3 is fitted into the tube body 2 until the container body 5 touches a bottom 15 of the tube body 2 so as to close the inflammation hole 16 of the tube body 2. The shaft body 19 of the holder 3 is inserted into the tube body 2 until the shaft body 19 touches a step portion 29 of the tube body 2 so that the flange 17 of the tube body 2, the ring plate body 24 and the sealing ring 28 are touched one another. Thus, the shaft body 19 of the holder 3 is fitted in an opening of the tube body 2. The tube body 2 is thereby assembled on the holder 3.

Then, the tube body 2 assembled on the holder 3 is fitted into the cup body 1. The holder 3 is inserted into the cup body 1 until the flange 17 of the tube body 2 abuts the step portion 12 inside of the cup body 1. The cylindrical body 23 of the reinforcement 4 is fitted in the opening of the cup body 1. The gas generator G is thereby assembled.

Hereby, the tube body 2 and the container body 5 of the squib S, etc. are accommodated in the cup body 1. The tube body 2 and the cup body 1 construct the combustion chamber N. The flange 17 of the tube body 2 is located between the step portion 12 of the cup body 1 and the ring plate body 24. In other words, the step portion 12 of the cup body 1, the flange 17 of the tube body 2 and the ring plate body 24 are arranged in this order from the bottom, 11 of the cup body 1 and touch one another.

Figure 4:
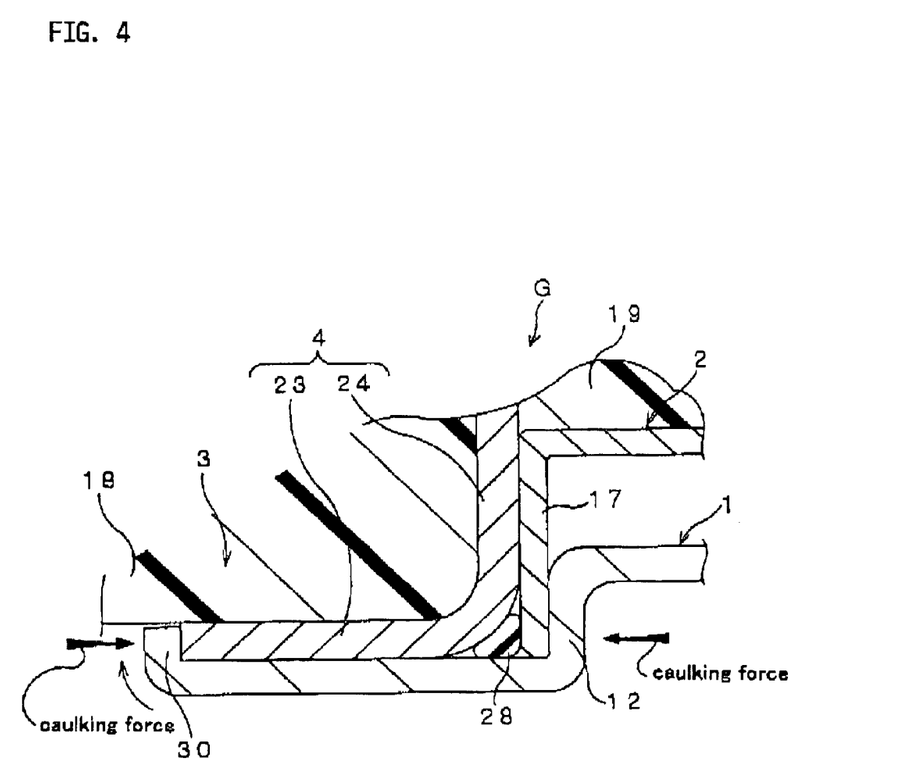
FIG. 4 is an enlarged sectional view of a principle part of FIG. 1.

In the above-mentioned condition, as shown in FIG. 4, an edge on the opening side of the cup body 1 is bent towards the holder 3 for the purpose of caulking. The cylindrical body 23 of the reinforcement 4 is folded by the bent portion 30 and the step portion 12 by the caulking force.

Thereby, the step portion 12 and the flange 17 of the tube body 2 are pushed towards the ring plate body 24 by the caulking force, then the sealing ring 28 is deformed. Inter-gaps among of the cup body 1, tube body 2 and the ring plate body 24 are tightly closed.

Even when the caulking force acts on the holder 3 through the flange 17 of the tube body 2, the reinforcement 4 consist of the ring plate body 24 and the cylindrical body 23 prevents the holder 3 from deforming.

In the gas generator G, electric current flows through the electrode pins 7, 8, and heat generated in the bridge wire 9 ignites the igniting agent ball 10 then the firing agents 6 are subsequently fired. A flame of ignition of the squib S is ejected into the cup body 1. The gas generants P are ignited and burned by the flame, then a large amount of gas generated. In succession, the large amount of gas is introduced from the cup body 1 to the above-mentioned seat belt pretensioner through the gas discharge hole which opens by means of rupture at the notches 13 of the bottom 11 in accordance with an increase of an internal pressure in the cup body 1. The seat belt pretensioner is actuated by the high pressure gas then fasten seat belts.

In the gas generator G of the present invention, the reinforcement 4 prevents the holder 3 form being deformed by the caulking force even if the holder 3 was formed of resin. Also, the reinforcement 4 prevents the holder 3 from being deformed by a thermal expansion. Particularly, a construction in which the flange 17 of the tube body 12 touches the ring plate body 24 of the reinforcement 4, prevents the caulking force from acting on the resin of the holder 3 directly. Therefore, gaps do not arise due to the caulking force, thermal expansion and the like.

Accordingly, water and the like are prevented from entering the tube body 2 and the like. As a result, performance of the gas generator G is ensured over a long period of time of use.

In the gas generator G of the present invention, since the caulking force acts between the cup body 1 and the reinforcement 4 of the holder 3, a high accuracy in caulking position is not required. Therefore, by a simple construction of the present invention, the inter-gaps among the cup body 1, the tube body 2 and the holder 3 are tightly closed.

Since the inter-gaps among the cup body 1, the tube body 2 and the holder 3 are integrally sealed by the caulking force acting substantially between the cup body 1 acid the reinforcement 4, the number of caulking members such as sealing rings can be decreased. Therefore, the gas generator G can be provided, which has excellent durability and for which the cost of manufacturing is reduced.

The gas generator G having the cup-shaped reinforcement 4 has been described. However, the gas generator G is not limited to the above-mentioned gas generator. The reason in which the reinforcement 4 is formed into a cup shape, is that a strength of the holder 3 is increased by the ring plate body 24 and the cup body 1 mounts and is fixed on the cylindrical body 23 easily by caulking force. Regarding these points, the reinforcement shown in FIGS. 5 and 6 may be adopted.

Figure 5:
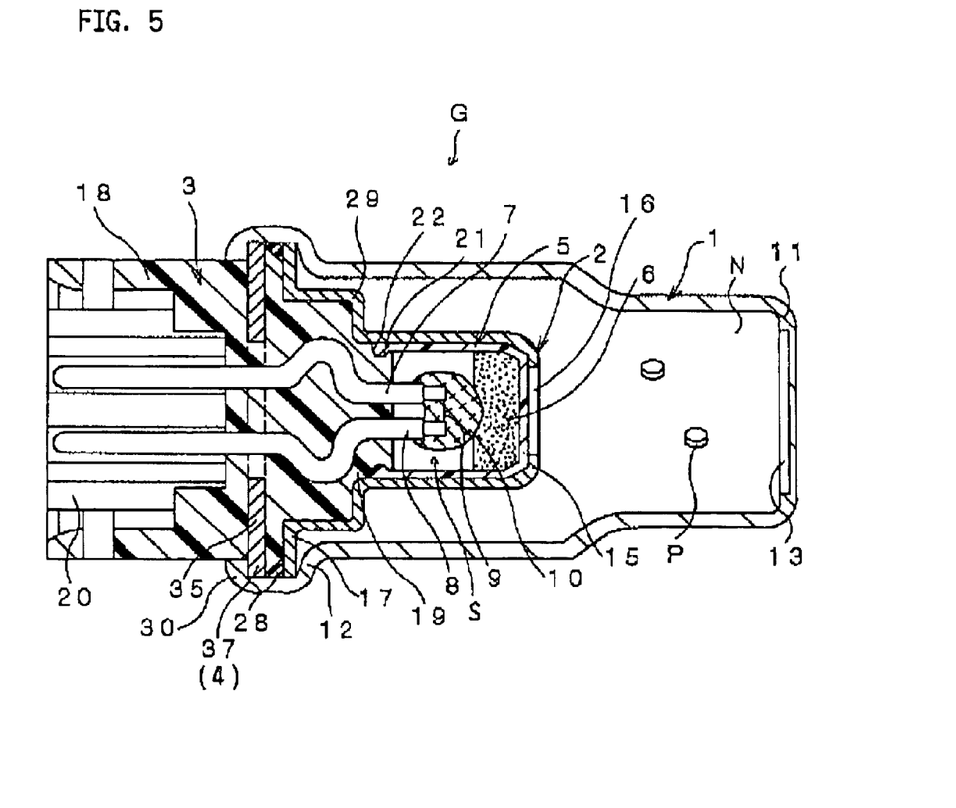
FIG. 5 is a built-up sectional view showing a first variant of a gas generator of the present invention.

A reinforcement 4 shown in FIG. 5 is only formed with a ring plate body 35. An outer periphery side of the ring plate body 35 protrudes from the holder 3 so as to form a protruding portion 37 and an inner periphery side thereof is integrated with the resin of the holder 3. In a condition in which the protruding portion 37 of the ring plate body 35 is fitted in an opening of the cup body 1, an edge of the cup body 1 on the opening side is bent towards the holder 3 for the purpose of caulking. The protruding portion 37 of the ring plate body 35 is folded by the bent portion 30 and the step portion 12 with caulking force. Thereby, inter-gaps among the cup body 1, the tube body 2 and the holder 3 are tightly closed.

FIG. 5 shows a construction in which the flange 17 of the tube body 2 abuts the holder's main body 18 without touching the protruding portion 37 of the ring plate body 35. However, a construction may be adopted, in which the protruding portion 37 of the ring plate body 35 touches the flange 17 of the tube body 2.

Figure 6:
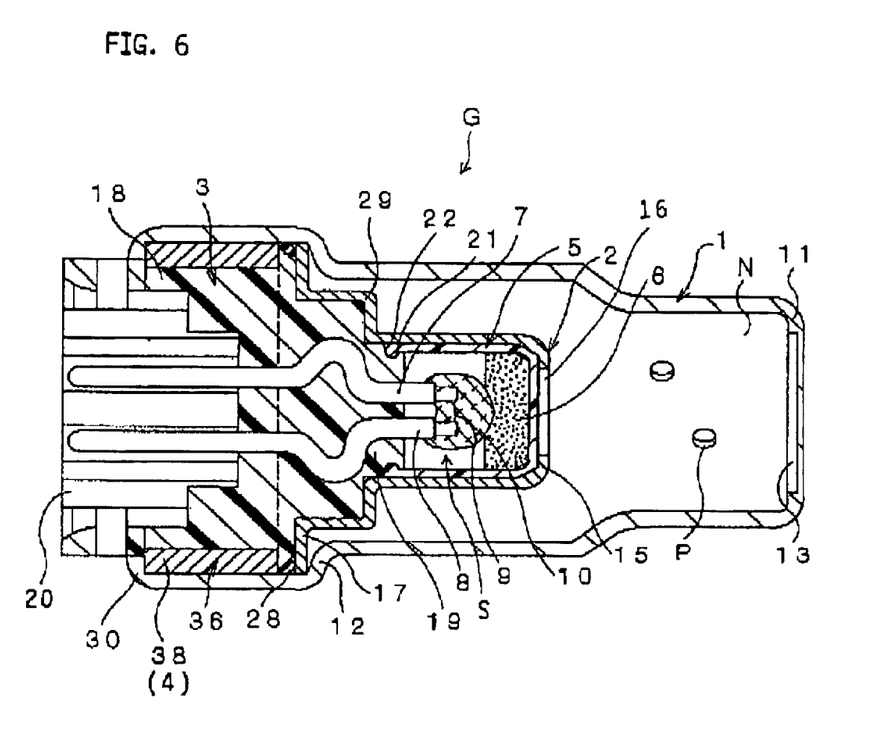
FIG. 6 is a built-up sectional view showing a second variant of a gas generator of the present invention.

A reinforcement 4 shown in FIG. 6 is only formed with a cylindrical body 36. An outer periphery side of the cylindrical body 36 protrudes from the holder 3 so as to form a protruding portion 38 and an inner periphery side thereof is integrated with the resin of the holder 3. In a condition in which the protruding portion 38 of the cylindrical body 36 is fitted in an opening of the cup body 1, an edge of the cup body 1 on an opening side is bent towards the holder 3 for the purpose of caulking. The protruding portion 38 of the cylindrical body 36 is folded by the bent portion 30 and the step portion 12 caulking force. Thereby, inter-gaps among the cup body 1, the tube body 2 and the holder 3 are tightly closed.

FIG. 6 shows a construction in which the flange 17 of the tube body 2 touches the Y holder's main body 18 without touching the protruding portion 38 of the cylindrical body 3G. However, a construction may be adopted, in which the protruding portion 38 of the cylindrical body 36 touches the flange 17 of the tube body 2.

Further, another embodiment of the present invention will be given with reference to the drawings.

Figure 7:
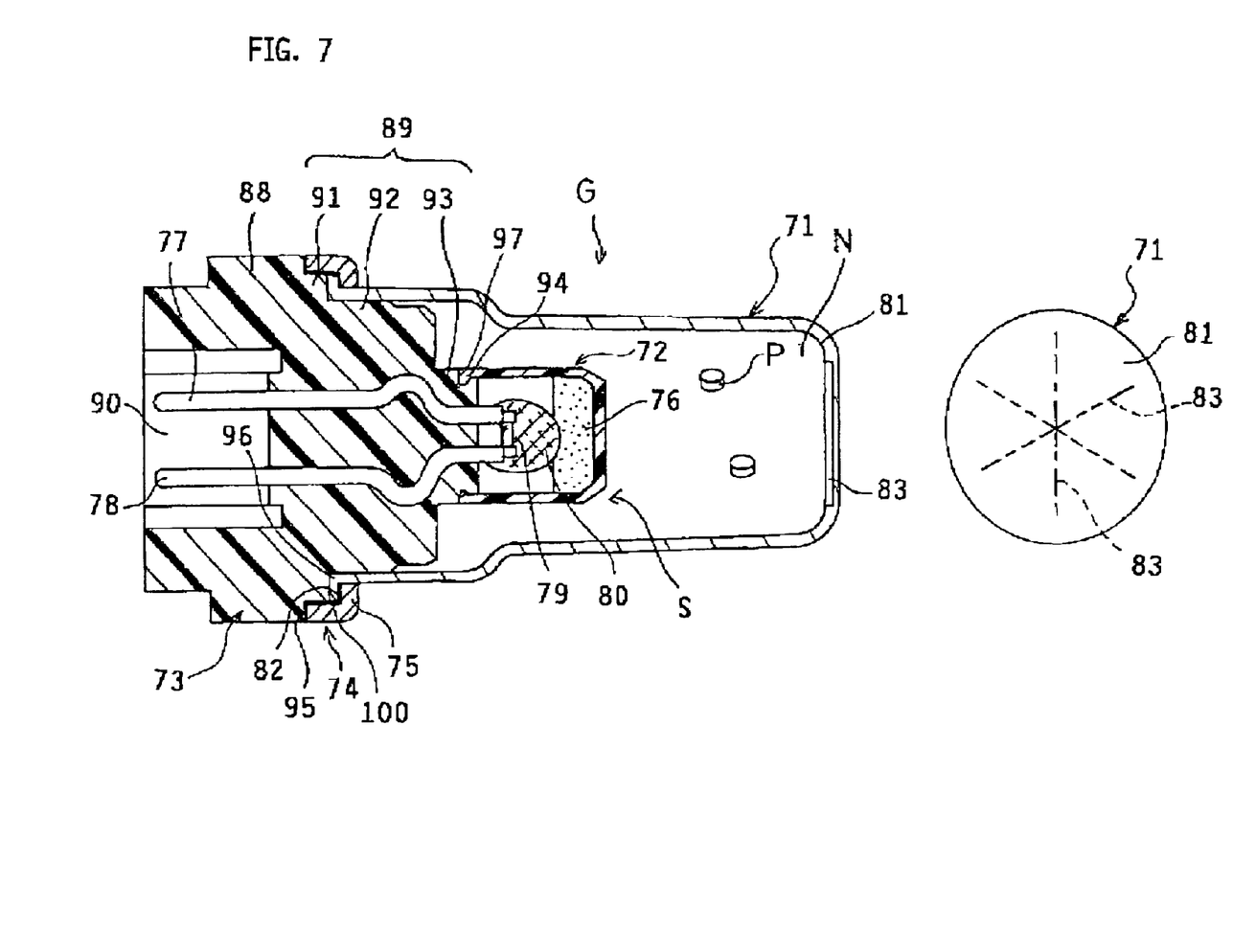
FIG. 7 is a built-up sectional view showing another gas generator of the present invention.
Figure 8:
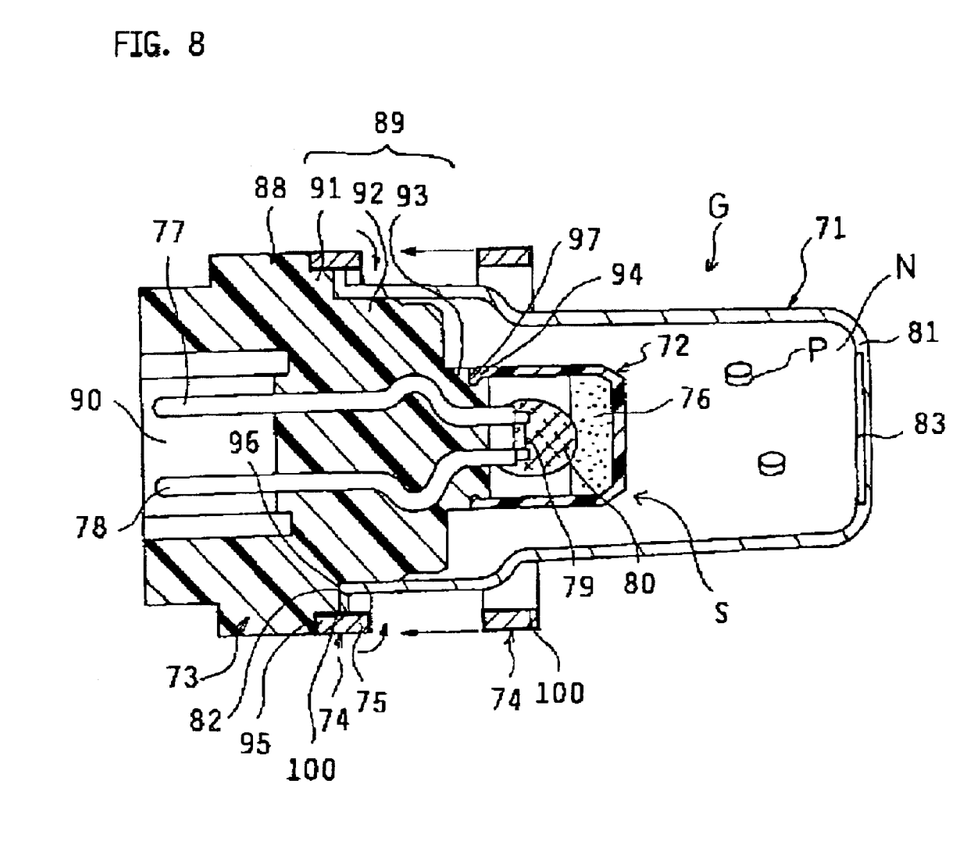
FIG. 8 is an exploded sectional view showing a gas generator of the present invention.

Similarly to the above-mentioned gas pretensioner for seat belt of an automobile are shown in FIGS. 7 and 8. In addition to a squib S and gas generants P, the rispective gas generator G includes a cup body 71 in a cylindrical shape with a bottom loaded with the gas generants P, a container body 72 in a cylindrical shape with a bottom included in the squib S, a holder 73, and a ring body 74 for caulking. The holder 73 is made of resin. In the gas generator G, inter-gap between the cup body 71 and the holder 73 is tightly closed by using the ring body 74 for caulking. The squib S includes firing agents 76, two electrode pins 77, 78, a bridge wire 79 and an igniting agnet ball 80 in addition to the container body 72. The squib S is integrated with the holder 73.

The cup body 71 of the gas generator G is made of metal materials such as stainless steel or aluminum into a cup shape and loaded with the gas generants P that generate gas by combustion. A diameter of the cup body 71 increases from a bottom 81 side to an opening side with step portions. A flange 82 is integrally formed on an opening portion of the cup body 71, which extends in an outwardly radial direction of the cup body 71. A plurality of notches 83, e.g. six notches, are farmed on the bottom 81 of the cup body 71, which are radially arranged at an axis of the cup body 71 and notched with a predetermined depth inside of the cup body 71. The notches 83 enable a gas discharge hole to open on the bottom 81 in accordance with an increase of an internal pressure in the cup body 71. Thereby, the Inside and outside of the cup body 71 are communicated through the gas discharge hole.

The container body 72 is disposed inside of the cup body 71. The container body 72 is, for example, made of resin into a cup shape and contains the firing agents 76. An annular protrusion 94 is integrally formed at an opening portion of the container body 72, which protrudes in the inwardly radial direction of the container body 72.

The holder 73 has a holder's main body 88 and a shaft body 89 are formed integrally. A fitting hole 90 for a plug is formed in the holder's main body 88, which opens towards a side opposite to a shaft body side. The diameter of the shaft body 89 decreases from a holder's main body side to a tip end side thereof with three stages. Therefore, the shape of the shaft body 89 has shoulder portions, a mounted shaft 91 mounted by the ring body 74, an inserted shaft 92 inserted into the cup body 71 and a fitted shaft 93 fitted into the container body 72. An annular fitting groove 97 is formed on the fitted shaft 93 of the shaft body 89, in which the protrusion 94 of the container body 72 is fitted. The holder 73 is preferably formed by injecting resin containing glass fibers and the like into a mold (not shown). As examples of the resin, there are polybutylene terephthalate, polyethylene terephthalate, nylon 6, nylon 66, polyphenylene sulfide, polyphenylene oxide and the like.

The holder 73 is integrally provided with electrode pins 77, 78, a bridge wire 79 and an igniting agent hall 80 in addition to the container body 72 of the squib S and the firing agents 76. The holder 73 18 formed by the following insert molding. The electrode pins 77, 78 are set in the above-mentioned mold in advance. Then resin is injected into the mold. As a result, the resinous holder 73 is obtained, which is integrated with the electrode pins 77, 78.

The electrode pins 77, 78 are arranged in parallel to an axis of the holder 73 and penetrate shaft body 89 of the holder 73. The respective electrode pin 77, 78 bas a curved portion in the shaft body 89 and protrudes into the fitting hole 90 of the holder's main body 88 and the container body 72. The respective electrode pin 77, 78 is made of conductive materials such as stainless steel or iron-nickel alloy and electrically insulated by the resin of the holder 73. The bridge wire 79 is welded by welding and the like to the respective electrode pin 77, 78 in the container body 72. The bridge wire 79 generates heat when electric current flows through between the electrode pins 77, 78, then the igniting agent ball 80 is ignited. The igniting agent ball 80 is formed so as to cover tip end portions of the respective electrode pin 77, 78 and the bridge wire 79. The igniting agent ball 80 is contacted with the fining agents 76 in the container body 72.

The ring body 74 is made of metal materials such as stainless steel or aluminum and formed into a cylindrical shape. An inside diameter of the ring body 74 is substantially equal to an outside diameter of the mounted shaft 91. The ring body 74 is mounted on an outer periphery of the mounted shaft 91 of the holder 73 by being press-fitted. Thereby, the ring body 74 is prevented from falling off the mounted shaft 91 because the ring body 74 is connected to the mounted shaft 91 of the holder 73 with friction. For connecting the ring body 74 to the mounted shaft 91 of the holder 73, the following constructions may be adopted as well as the above-mentioned frictional contact. (i) A construction in which an inner periphery of the ring body 74 and an outer periphery of the mounted shaft 91 have screws-threads respectively, and then the ring body 74 and the mounted shaft 91 are connected to each other by threaded engagement 74. (ii) A construction in which the ring body 74 is mounted on an outer periphery of the mounted shaft 91 of the holder 73 then the ring body 74 is coupled to the mounted shaft 91 with a bolt and the like.

An edge of the ring body 74 on the cup body 71 side is bent towards a flange 82 of the cup body 71 for caulking. And an inter-gap between the cup body 71 and the holder 73 is tightly closed.

The gas generator G constructed as above is manufactured in the following steps.

The cup body 71 and the container body 72 are made in advance so as to have cup shapes respectively. Also, the ring body 74 is made in advance so as to have a cylindrical shape. The gas generants P are loaded in the cup body '71 and the firing agents 76 are loaded in the container body 72. The following insert molding steps are carried out in order to obtain the resinous holder 73 including the electrode pins 77, 78 integrally. The electrode pins 77, 78 are set in a mold in advance. Resin is injected into the mold. The resinous holder 73 is obtained, which is integrated with the respective electrode pin 77, 78. Tip portions of the electrode pins 7, 8, which project from the shaft body 89 of the holder 73, are respectively welded to the bridge wire 79. The igniting agent ball 80 covers the bridge wire 79 and the like.

Then, the igniting agent ball 80 of the squib S integrated with the holder 73 is inserted into the container body 72. And the fitted shaft 93 of the holder 73 is fitted into the container body 72. The bridge wire 79, the igniting agent ball 80 and the like are contained in the container body 72 under a condition where the igniting agent ball 80 is in contact with the firing agents 76. The squib S is integrated with the holder 73. The container body 72 of the holder 73 is inserted into the cup body 71. And the inserted shaft 92 is inserted into an opening portion of the cup body 71. At this time, the flange 82 of the cup body 71 touches a first shoulder portion 96 formed between the mounted shaft 91 and the inserted shaft 92 of the holder 73. Thereby, a combustion chamber N is formed. Therefore, the holder 73 is made an enclosed space for containing the gas generants P in the cup body 71 as well as the enclosed space for containing the firing agents 7G in the container body 72.

After the holder 73 is fitted into the cup body 71, the cup body 71 is inserted into an opening of the ring body 74. The ring body 74 is mounted on an outer periphery of the mounted shaft 91 of the holder 73 and an outer periphery of the flange 82 of the cup body 71 by press-fitting. One edge of the ring body 74 abuts a second shoulder portion 95 formed between the holder's main body 88 and the mounted shaft 91. The other edge of the ring body 74 protrudes beyond the flange 82 towards the bottom side of the cup body 71 by a predetermined length which enables caulking. (See FIG. 8).

Figure 9:
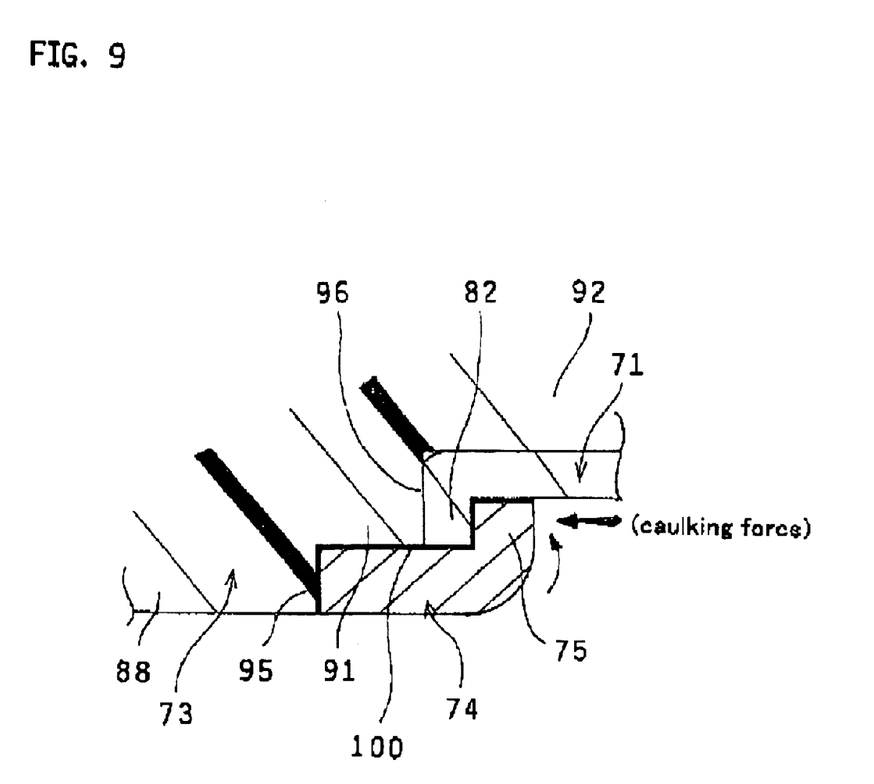
FIG. 9 is an enlarged sectional view of a principle part of FIG. 7.

For the purpose of caulking, as shown in FIG. 9, the other edge portion 75 of the ring body 74 protruding towards the bottom side of the cup body 71 is bent towards the opening side of the cup 71, 1.e.the flange 82 side, with caulking force. The flange 82 of the cup body 71 is pushed on the first shoulder portion 96 of the holder 73 by the caulking force. The inter-gap between the cup body 71 and the holder 73 are tightly closed. In the manner described above, the gas generator G is manufactured.

The caulking force on the ring body 74 is restrained by the metallic flange 82 of the cup body 71, so that the caulking force does not act on the resin of the holder 73 directly then the holder is not deformed.

In this gas generator G, when electric current flows through the electrode pins 77, 78, heat arises in the bridge wire 79 then ignites the igniting agent ball 80. And subsequently the firing agents 76 are fired. Flames of the squib S are ejected from the container body 72 into the cup body 71. By the flames, the gas generants P are ignited and burned, then a large amount of gas generates. The large amount of gas generated in the cup body 71 flows into the seat belt pretensioner with a rush through the gas discharge hole which opens by means of that the bottom 81 of the cup body 71 ruptures partially at the respective notches 83 in accordance with increase of internal pressure in the cup body 71. The seat belt pretensioner is actuated by the high pressure gas flowing thereto, then fastens seat belt.

In the gas generator G of the present invention, even when the holder 73 is made of resin, a gap between the cup body 71 and the holder 73 can be tightly closed by means of a simple caulking operation in which the ring body 74 is pushed onto the flange 82 of the cup body 71 with the caulking force without high accuracy in the caulking position. In other words, the accuracy in the caulking position and the use of precision devices for caulking etc. are not required.

Instead of a construction in which the end portion of the cup body 71 is directly folded onto the holder 73 for caulking, a construction in which the end portion of the ring body 74 is folded onto the flange 82 of the cup body 71 for caulking, is adopted in the present invention. As a result, the caulking force does not act on the resin of the holder 73 directly through the flange 82 of the cup body 71. Thereby deformation of the holder 73 is prevented. Particularly, when the cup body 71 is made of metal material, it is clear that the caulking force does not act on the resin of the holder 73 directly.

As a result, the cost of manufacturing the gas generator G is decreased. Also, gaps are prevented from being made by deformation of the holder 73. Therefore, water and the like does not enter the tube body and the performance of the gas generator G is ensured over a long period of time of use. A gas generator with excellent durability, of which the cost of manufacture is reduced, can be hereby provided.

In the gas generator G of the present invention, tight couplings among the ring body 74, the cup body 71 and the holder 73 are improved when a sealing layer 100 is provided among the ring body 74, the cup body 71 and the holder 73 as shown in FIGS. 7 and 8. Consequently, the gas generator has an excellent durability. Adhesives such as epoxy resin and silicon tapes etc. may be used as sealing materials for the sealing layer 100. It is preferable to use adhesive as the sealing materials in order to strengthen the connection between the ring body 74 and the holder 73.

Before the ring body 74 is mounted on the holder 73, adhesive is applied to the ring body 74. The sealing layer 100 consisting of the adhesive is formed among the ring body 74, the cup body 71 and the holder 73. In another case, in advance, an adhesive is applied onto some portions of the holder 73 and the cup body 71. The some portions should be in contact with the ring body 74. After that, the ring body 74 is mounted. Thus, the sealing layer 104 may be formed.

Figure 10:
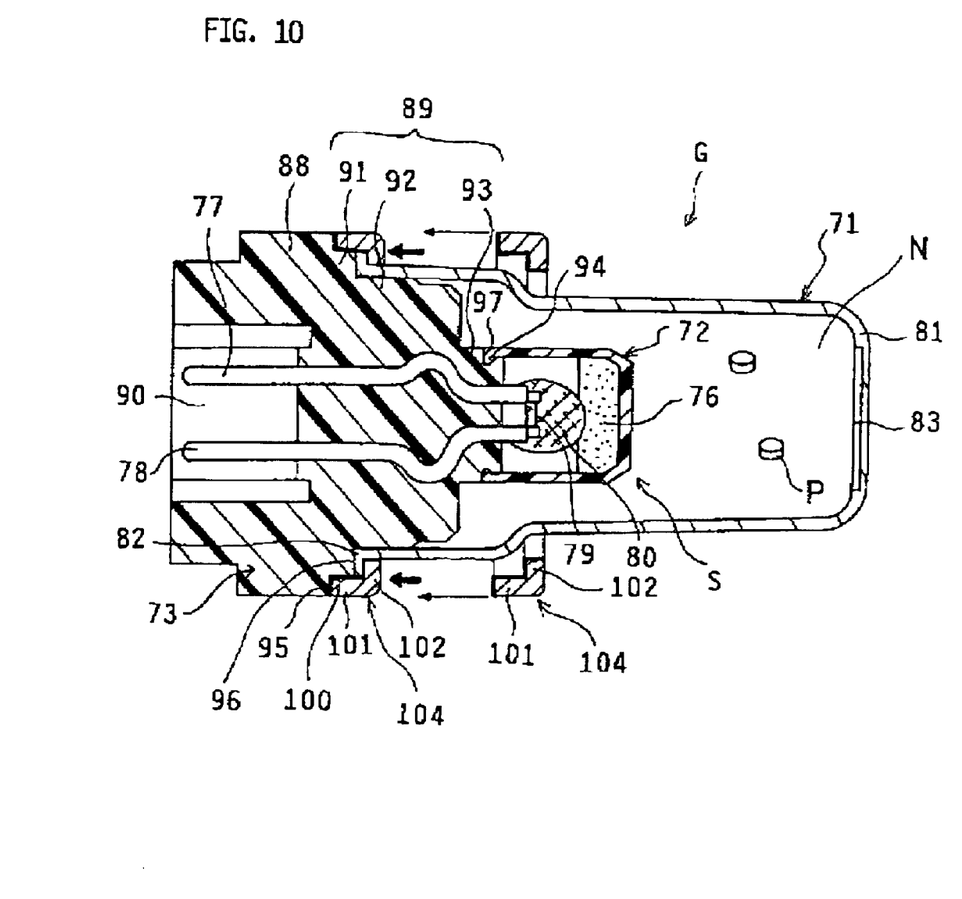
FIG. 10 is a built-up sectional view showing a variant of a gas generator of the present invention.

The ring body 74 is not limited to the ring body made of such metal material as stainless steel or aluminum. Any ring body 74 may be employed so long as the ring body 74 can be folded towards the opening side of the cup body 71 after fixing on the holder 73 and pushed onto the flange 82 of the cup body 71 for caulking. For example, if the above condition is fulfilled, the ring body 74 may be made of resin. Further, a ring body 104 shown in FIG. 10 may be adopted in the gas generator G of the present invention. The ring body 104 shown in FIG. 10 is formed into a cup shape with a cylindrical member 101 and a ring-shaped plate member 102 connected substantially perpendicular to the cylindrical member 101. The ring body 104 is made of metal materials, such as stainless steel or aluminum, or resin etc.

The cup body 71 is inserted in the ring body 104 shown in FIG. 10. The cylindrical member 101 mounts on an outer periphery of the mounted shaft 91 of the holder 73. The ring-shaped plate member 102 abuts the flange 82 of the cup body 71 on an opening side thereof. The flange 82 of the cup body 71 is sandwiched in between the ring-shaped plate member 102 of the ring body 104 and the first shoulder portion 96 of the holder 73. Consequently, a gap between the cup body 71 and the holder 73 is closed. At this time, in order to improve the seal property, the following operation may be carried out. The ring-shaped plate member 102 of the ring body 104 is pushed onto the flange 82 of the cup body 71 with caulking force, as an effect, the flange 82 of the cup body 71 is forced onto the holder 73. According to the ring body 104, such an operation of bending the ring body 74 as shown in FIG. 7 towards the opening side of the cup body 71 is omitted. And the deformation of the resin of the holder 73 by the bending force is prevented. Also, the cost of manufacturing the gas generator G may be decreased since the bending operation is not necessary.

When a sealing layer 100 such as an adhesive is formed among the cylindrical member 101 and the ring-shaped plate member 102 of the ring body 104, the cup body 71 and the holder 73, the seal property is improved as well as described in FIG. 7.

Further, it is preferable that, in the ring body 104, an inside diameter of the cylindrical member 101 is substantially equal to an outside diameter of the mounted shaft 91 and an inside diameter of the ring-shaped plate member 102 is substantially equal to an outside diameter of the cup body 71 on an opening side thereof. Thereby, when the ring body 104 is mounted on the holder 73, the seal property among the ring body 104, the cup 71 and the holder 73 is improved by the friction contact of the above-mentioned components since the cylindrical member 101 and the plate member 102 are respectively press-fitted on the outer periphery of the mounted shaft 91 and the outer periphery of the cup 71 on the opening side thereof.

Industrial Applicability

The gas generator of the present invention is most suitable for occupant safety systems such as seat belt pretensioner since the present invention has excellent durability and the manufacturing cost is reduced.

What is claimed is:

1. A gas generator comprising:

a cup body loaded with gas generants generating gas by combustion, a tube body arranged inside of the cup body to contain firing agents ignited by electric current, a holder made of resin and fitted in both the cup body and the tube body for enclosing the gas generants and the firing agents, and a reinforcement integrated with the resin of the holder by insert molding, wherein the reinforcement has a portion protruding from an outer periphery of the holder, the protruding portion is fitted into the cup body, and inter-gaps among the cup body, the tube body and the holder are tightly closed by a caulking force between the protruding portion and the cup body.

2. The gas generator according to claim 1, wherein the tube body has a flange protruding towards the cup body, the flange is sandwiched in between the cup body and the protruding portion of the reinforcement.

3. A gas generator comprising:

a cup body loaded with gas generants generating gas by combustion, a tube body arranged inside of the cup body to contain firing agents ignited by electric current, a holder made of resin and fitted in both the cup body and the tube body for enclosing the gas generants and the firing agents, and a reinforcement integrated with the resin of the holder by insert molding, wherein the reinforcement comprises a cylindrical body and a ring plate body so as to form a cup shape, the cylindrical body protrudes from an outer periphery of the holder, and the ring plate body is integrated with the resin of the holder.

* * * * *